United States Patent Office 3,160,580
Patented Dec. 8, 1964

3,160,580
PROCESS FOR DESULFURIZING AND DEODORIZING HYDROCARBONS
Karl Achenbach, Frankfurt (Main), and Kurt Osterloh and Wilfried Rothe, Bochum, Germany, assignors to Deutsche Gold- und Silber-Scheideanstalt vormals Roessler, Frankfurt am Main, Germany, and Dr. C. Otto & Company G.m.b.H., Bochum, Germany
No Drawing. Filed Oct. 25, 1962, Ser. No. 233,149
Claims priority, application Germany, Oct. 26, 1961, D 37,315
5 Claims. (Cl. 208—226)

The present invention relates to an improved process for deodorizing and desulfurizing hydrocarbons, especially oils, by treatment with sodium.

It is known that oils can be effectively desulfurized and thereby deodorized with the aid of finely divided metallic sodium. In such process the alkali metal is, for example, injected into the reaction chamber in finely divided form or distributed on carriers so that a large surface thereof can come into contact with the hydrocarbons to be treated. While the desulfurization progresses rapidly and intensively certain difficulties are encountered with this mode of operation.

The primary cause for such difficulties is that in view of the high reactivity of metallic sodium resinous products are produced with certain types of hydrocarbons which is usually referred to as gum formation. These resinous products build up on the surfaces of the metallic sodium and reduce its effectiveness so that the desulfurization reaction is slowed down considerably and the intensity of the desulfurization or completeness of the utilization of the sodium decreases after longer periods of operation. In addition, considerable losses in yield occur. As a consequence, continuous operations of desulfurization plants operating with sodium are prone to disturbances. In addition, the processing of the resinous sodium residues causes special difficulties.

According to the invention it was found that the deleterious gum formation could be effectively prevented when an alkali metal hydride, such as sodium hydride, is employed instead of the alkali metal per se. Very surprisingly it was found that the reaction is essentially only repressed with reference to gum formation whereas the speed of desulfurization remains practically the same as when the alkali metal per se, for example, sodium, is used. The sodium hydride furthermore can be entirely or partially replaced by sodium monoxide. The latter according to a further embodiment of the invention can, if desired, be given a pretreatment with hydrogen which as is known produces a mixture of sodium hydride and sodium hydroxide.

The sodium hydride or sodium monoxide employed according to the invention is used in a form providing a large surface for contact with the hydrocarbons to be treated. It is not necessary to distribute such substances on inert carriers as they normally occur in powdered form or in the form of a free flowing mass. As a consequence, it is possible to subject such refining agents to a continuous movement and surface renewal by operating with mixing worms, rotating tubes or in fluidized beds.

Although, as indicated above, the sodium hydride or monoxide can be used as such, expediently in the form of shaped bodies, one can also distribute such substances in the normal manner upon inert carriers, such as common salt, carbon in the form of charcoal or coke or to mix them with such materials in order to increase the reacting surface. It also is possible, especially in continuous operations, to apply the hydride or oxide to spent reaction masses or to distribute such compounds mechanically in such masses and to recycle the thus regenerated masses. It is also expedient to produce shaped bodies from mixtures of the hydride or oxide with inert materials, such as common salt or carbon, in the shape of spheres, cylinders, tablets and the like, by molding or extrusion before their use in the process according to the invention.

According to the invention the hydrocarbon or hydrocarbon mixture to be purified, such as a mineral oil, is caused to react, generally, in the gaseous phase, for example, at temperatures over 150° C. with the alkali metal hydride or monoxide. It, however, is also possible to introduce the alkali metal compounds into the liquid hydrocarbon or to allow the liquid hydrocarbon to trickle over a bed of such alkali metal compounds.

It also can be of advantage to permit the sodium hydride or sodium monoxide to act on the hydrocarbon to be desulfurized in the presence of hydrogen as a desired increase in the velocity of the desulfurization can be engendered thereby.

The process according to the invention has many applications. For example, it can be employed for the unavoidable removal of the relatively small quantities of organically bound sulfur in coal gases used for synthesis purposes, for example, in ammonia synthesis. It can also be employed for the removal of thiophene sulfur which as is known is one of the most stable organic sulfur compounds. Such removal over longer periods of time normally presents certain difficulties if the cost is to be maintained within practical limits. The process according to the invention which in addition to removing mercaptans also permits removal of disulfide sulfur and especially thiophene from gas mixtures therefore joins the known processes of catalytic conversion, adsorption with active carbon or alkalized iron oxide masses.

When a dry gas mixture which has been freed of $CO_2$ of the composition

| | Percent |
|---|---|
| CO | 4 |
| $H_2$ | 72 |
| $CH_4$ | 1 |
| $N_2$ | 23 | and having a total organic sulfur content of 25 mg./Nm.³ is passed over sodium hydride or sodium monoxide the sulfur content is reduced to below 1 mg./Nm.³. When sodium monoxide is used a desulfurized gas of the same composition is obtained at temperatures below 200° C. However, when temperatures above 200° C. are employed a hydrogenation of the sodium monoxide occurs at the beginning so that at the beginning, naturally, the composition of the treated gases alters but after such hydrogenation has been completed the treated gases again have the same composition. The desulfurizing effect remains the same both during the hydrogenation phase and when the hydrogenation of the monoxide has gone to completion.

Hydrocarbon gases of the range $C_1$–$C_5$ which are obtained by pyrolysis or catalytic reforming which contain more or less large quantities of olefins and acetylenes, as well as organic sufur compounds in the form of mercaptans, carbonyl sulfide and the like, often require removal of the organically bound sulfur to the order of magnitude of <5 p.p.m. when they are subsequently to be processed catalytically. Such gases can be desulfurized according to the invention, however, the type of double and triple bonds contained in the hydrocarbon gases whether conjugated or cumulated is of importance with regard to the temperature employed. The $C_1$–$C_5$ gas mixture is passed over the sodium hydride or monoxide which are supported in the finest state of subdivision on porous inert carriers, such as common salt or carbon and the like, maintaining periods of contact between about 80 and 120 seconds, preferably about 95 seconds, to remove the organic sulfur compounds. If it is necessary to retain compounds of the allene or diene type, the chemical sorption is carried out at room temperature. The optimum conditions for the process according to the invention can easily be ascertained depending upon the desired gas composition aimed at. When higher pressures, for example, up to 15 atmospheres' gauge pressure are employed it is expedient to operate above the critical temperature.

Another field for use of the process according to the invention is for the purification of benzenoid hydrocarbons, such as benzene, toluene and xylene, which are finding increasing use in the chemical industry and higher quality requirements are being made for such products which are recovered from crude benzene.

In the development of the process according to the invention it was found that in passing hydrocarbon vapors over sodium hydride and especially over sodium monoxide it is not only possible to remove the organically bound sulfur in the form of mercaptans, sulfides, thiophenes and the like substantially completely but also in addition to remove a large portion of the olefins contained therein. The latter is desirable in the production of pure benzene, toluene and xylene and it was found that when purified benzene, toluene and xylene vapors were passed over sodium hydride or monoxide in the process according to the invention it was possible to obtain products which in their purity fully meet the requirements for pure or purest goods according to the specifications of the German specification 55/1–3 as well as the English norms NBA 50/2–9 as well as U.S. standards ASTM 52D.

The procedure which represents a precison purification can be employed in such cases where the products of the benzene, toluene and xylene fractions purified by the classical and refining process are to be processed to extremely high chemical purity.

The procedure employed, for example, is as follows: The benzene, toluene or xylene fraction to be refined is passed in the gas phase over a reaction mass according to the invention containing sodium hydride or sodium monoxide at temperatures between 150° C. and 250° C., preferably 220° C. In order to utilize the sensible and latent heat contained in the treated gases leaving the reactor a distillation column can be connected behind such reactor. After such treatment the fraction is of purest quality and can only be improved by freezing out such aliphatic trace components as are present in all usual commercially pure or extremely pure products regardless of the refining method used insofar as they were produced from coal.

The impurities still contained in a benzene purified by the acid refining process usually, for example, consist of the following components:

(1) Methylcyclopentadiene
(2) Cyclohexene
(3) Cyclohexadiene
(4) Methylethylketone
(5) Acetonitrile
(6) Diethylsulfide
(7) Thiophene
(8) 2-methylhexane
(9) 3-methylhexane
(10) 3-ethylpentane
(11) n-Heptane Components 1 and 3–7 are removed by the process according to the invention along with organic sulfur compounds, the remaining components in view of their azeotropic behavior cannot be separated from benzene by simple rectification and can only be removed by freezing out as has already been indicated.

The effectiveness of the process according to the invention is illustrated by the following examples.

*Example 1*

In parallel tests a ligroin (end boiling point 140° C., total S content 0.11% by wt.) was vaporized and passed at a temperature of 170° C. through a reaction mass contained in an iron tube. In the first test the reaction mass consisted of 90% of common salt and 10% metallic sodium and in the second test of 90% of common salt and 10% of sodium hydride. In both instances the metallic sodium and respectively the sodium hydride were in finest distribution on the salt particles. By taking samples at various times and determining the sulfur content, the effectiveness of the desulfurization in continued operation was determined. After two hours' operation the sulfur content for the sample desulfurized with metallic sodium was 0.0025% and that of the sample desulfurized with sodium hydride 0.0024%. On the other hand, after 120 hours' operation the sample treated with the metallic sodium containing reaction mass still contained 0.0670% of sulfur whereas that treated with the sodium hydride containing mass only contained 0.0030%. It can be seen therefrom that the activity of the sodium hydride had not significantly decreased even after 120 hours' operation whereas the activity of the metallic sodium had decreased considerably. The sodium hydride mass after the 120 hours' operation was not coated in any way and could have been used further until it was completely used up. The mass containing the metallic sodium, on the other hand, was coated with a gum like resin layer. If the same desulfurization effect is to be maintained upon continued operation with metallic sodium it is necessary to decrease the throughput of the hydrocarbon vapors or to change and process the sodium containing mass more often.

*Example 2*

500 kg. of ligroin (B.P. 40–160° C.) with a sulfur content of 236 mg./kg. were evaporated per day in an evaporation plant and the vapors passed through a tower filled with 175 kg. of a contact mass consisting of a mixture of 50% by weight of $Na_2O$ and 50% by weight of NaCl compressed to tablets 13 mm. in diameter and 10 mm. thick. The tower was operated at a temperature between 220 and 250° C. under a gauge pressure of 2 atmospheres. The mass loading value for the contact mass which is a measure of the contact time was .120 which corresponds to 0.120 kg. ligroin/kg. contact mass. After a throughput of 25 tons of ligroin the sulfur content of the raffinate was 1–5 mg./kg.

*Example 3*

A hydrocarbon gas was desulfurized according to the invention with a mass of finely divided sodium hydride supported on sodium chloride at 20° C. and at 200° C. The following table gives the original gas composition as well as the composition attained at the different temperatures.

| | Original Composition | After treatment at— | |
|---|---|---|---|
| | | 20° C. | 200° C. |
| $C_3H_4$, Mol. Percent | 5.3 | 5.2 | <0.1 |
| $C_3H_6$, Mol. Percent | 51.3 | 51.8 | 49.4 |
| $C_4H_6$, Mol. Percent | 9.7 | 9.3 | 0.5 |
| $C_4H_9$, Mol. Percent | 8.1 | 7.9 | 17.9 |
| $C_2H_6$, Mol. Percent | 9.6 | 9.6 | 11.1 |
| $C_3H_8$, Mol. Percent | 7.3 | 7.4 | 9.7 |
| $C_4H_{10}$, Mol. Percent | 4.3 | 4.2 | 4.8 |
| $C_5H_6$, Mol. Percent | 1.5 | 0.8 | <0.1 |
| $C_6H_6$, Mol. Percent | 0.1 | 0.1 | 0.1 |
| $C_2H_2$, Mol. Percent | | | 1.0 |
| $CH_4$, Mol. Percent | | | 0.9 |
| $C_5H_8$, Mol. Percent | 0.4 | 0.3 | 0.2 |
| $N_2$, Mol. Percent | 2.4 | 3.4 | 4.4 |
| R–C CH, Vol. Percent | 2.3 | 2.4 | |
| Total Sulfur, mg./Nm.³ | 36.8 | 3.1 | 1.5 |

It will be seen therefrom that at 20° C. excellent desulfurization was attained without considerable change in the hydrocarbon composition whereas at 200° C. the quantity of the unstable hydrocarbons $C_3H_4$ (allene), $C_4H_6$ (butadiene) as well as $C_5H_6$ (cyclopentadiene) decreased in favor of other components.

*Example 4*

A purified benzene was desulfurized according to the invention with a mass of finely divided sodium monoxide supported on sodium chloride at about 220° C.

The following table gives the specifications of the original benzene and the resulting desulfurized product.

| | Original Benzene | Desulfurized Product |
|---|---|---|
| Color | (1) | (1) |
| Density (20° C.) | 0.8773 | 0.8790 |
| Refractive index $n_D^{20}$ | 1.5041 | 1.5039 |
| Bromine consumption | 0.08 | 0.004 |
| Sulfuric acid reaction | 0.07 | 0.01 |
| Cloud point, °C | 14.0 | |
| Crystallization point, °C | 5.3 | 5.4 |
| Total S content, mg./kg | 203 | <1 |

[1] Water light, clear.

*Example 5*

A partially purified benzene fraction boiling up to 100° C. was refined as in Example 4 with sodium monoxide.

The following table gives the specifications of the fraction both before and after treatment:

| | Before | After |
|---|---|---|
| Color | (1) | (1) |
| Density (20° C.) | 0.8744 | 0.8744 |
| Refractive index $n_D^{20}$ | 1.5026 | 1.5025 |
| Bromine consumption | 0.335 | 0.008 |
| Total S content, mg./kg | 450 | 9 |

[1] Water light, clear.

Toluene and xylene fractions as well as naphthalene with sulfur contents above 100 mg./kg. can be desulfurized to <10 mg./kg. by procedures analogous to those of Examples 4 and 5.

In general, the process according to the invention can be employed for the desulfurization of all organic compounds which do not react with alkali metal hydrides and monoxides. For example, sulfur containing alcohols and ethers were passed in vapor phase over sodium monoxide with the following results:

| Substance | Sulfur Content, mg./l. | |
|---|---|---|
| | Before Treatment | After Treatment |
| Methanol | [1] 45 | [3] <0.01 |
| Ethanol | 9 | <0.01 |
| Diethyl ether | [2] 37 | <0.01 |

[1] Mercaptan sulfur.
[2] Thioether sulfur.
[3] Limit of detectability.

We claim:
1. A process for desulfurizing hydrocarbons contaminated with organic sulfur compounds which comprises passing such contaminated hydrocarbons in dry form and in vapor phase over a finely divided active material selected from the group consisting of sodium monoxide and a mixture of sodium hydride and sodium hydroxide formed by hydrogenation of sodium monoxide, said finely divided material being supported on an inert carrier, at a temperature sufficiently high to effect reaction between the active material and the contaminating sulfur compounds.
2. The process of claim 1 in which said material is contacted with the active material in the presence of hydrogen.
3. The process of claim 1 in which the temperature employed is between 150 and 250° C.
4. The process of claim 3 in which said active material is sodium monoxide.
5. The process of claim 3 in which the contaminated hydrocarbon is a contaminated benzenoid hydrocarbon.

References Cited by the Examiner

UNITED STATES PATENTS

| 1,729,943 | 10/29 | Hofsass | 208 |
| 1,954,478 | 4/34 | Egloff | 208—112 |
| 2,854,496 | 9/58 | Wright | 260—667 |
| 2,968,681 | 1/61 | O'Connor et al. | 260—667 |

OTHER REFERENCES

Chemistry of the Hydrides, Hord; pages 30–35, especially page 31. John Wiley & Sons, Inc., N.Y., 1952.

ALPHONSO D. SULLIVAN, *Primary Examiner.*